US010607011B1

(12) United States Patent
Orhan

(10) Patent No.: US 10,607,011 B1
(45) Date of Patent: Mar. 31, 2020

(54) METHOD TO DETECT ZERO-DAY MALWARE APPLICATIONS USING DYNAMIC BEHAVIORS

(71) Applicant: Fatih Orhan, Bloomfield, NJ (US)

(72) Inventor: Fatih Orhan, Bloomfield, NJ (US)

( * ) Notice: Subject to any disclaimer, the term of this patent is extended or adjusted under 35 U.S.C. 154(b) by 235 days.

(21) Appl. No.: 15/215,793

(22) Filed: Jul. 21, 2016

Related U.S. Application Data

(60) Provisional application No. 62/194,879, filed on Jul. 21, 2015.

(51) Int. Cl.
*G06F 21/56* (2013.01)

(52) U.S. Cl.
CPC .... *G06F 21/566* (2013.01); *G06F 2221/2151* (2013.01)

(58) Field of Classification Search
CPC .............................. G06F 21/566; G06F 21/552
See application file for complete search history.

(56) References Cited

U.S. PATENT DOCUMENTS

| 8,375,450 B1 | 2/2013 | Oliver et al. | |
|---|---|---|---|
| 8,806,647 B1 | 8/2014 | Daswani et al. | |
| 9,158,915 B1* | 10/2015 | Yumer | G06F 21/566 |
| 2011/0283361 A1 | 11/2011 | Perdisci et al. | |
| 2012/0304244 A1* | 11/2012 | Xie | G06F 21/00 726/1 |
| 2013/0097706 A1 | 4/2013 | Titonis et al. | |
| 2014/0090061 A1 | 3/2014 | Avasarala et al. | |
| 2014/0380473 A1 | 12/2014 | Bu et al. | |
| 2015/0172300 A1* | 6/2015 | Cochenour | H04L 63/145 726/23 |

FOREIGN PATENT DOCUMENTS

| WO | 2011119940 A1 | 9/2011 |
|---|---|---|
| WO | 2012162102 A1 | 11/2012 |

OTHER PUBLICATIONS

Ahmed AlEroud "A Contextual Anomaly Detection Approach to Discover Zero-Day Attacks", 2012 International Conference on Cyber Security 978-0-7695-4938-5/12 $26.00 © 2012 IEEE, Published by the IEEE Computer Society, pp. 40-45.*
Mahinthan Chandramohan "Detection of Mobile Malware in the Wild" 0018-9162/12/$31.00 © 2012 IEEE, Published by the IEEE Computer Society Sep. 2012; pp. 65-71.*

(Continued)

*Primary Examiner* — Harunur Rashid
(74) *Attorney, Agent, or Firm* — Joseph P. Aina

(57) ABSTRACT

A method and system to identify and detect zero-day malware applications based on their behavioural analysis is disclosed. A new type of signature will be created out of dynamic behaviours of the applications, by monitoring and extracting some pre-defined features of the application such as file read/write, service start, loaded classes, incoming/outgoing network data which are gathered from the application at runtime. The method incorporates two steps for performing the identification: first, the dynamic behaviour is monitored and a pattern is extracted, then the activities of the actual application running on computer desktop or mobile device are intercepted and compared with the pattern previously extracted.

8 Claims, 14 Drawing Sheets

Detection of repackaged application at runtime

(56) References Cited

OTHER PUBLICATIONS

Luoxu Min, Qinghua Cao Runtime-based Behavior Dynamic Analysis System for Android Malware Detection Advanced Materials Research, vol. 756-759 pp. 2220-2225, 2013.

Yan Lok-Kwong, Heng Yin DroidScope: Seamlessly Reconstructing the OS and Dalvik Semantic Views for Dynamic Android Malware Analysis USENIX Security Symposium, 2012.

Burguera Iker, Urko Zurutuza and Simin Nadjm-Tehrani Crowdroid: Behavior-Based Malware Detection System for Android Proceedings of the 1st ACM workshop on Security and privacy in smartphones and mobile devices ACM, 2011.

Victor Van Der Veen, Bos Herbert and Christian Rossow Dynamic Analysis of Android Malware Internet & Web Technology Master thesis, VU University Amsterdam (2013).

Lukas Weichselbaum, Matthias Neugschwandtner, Martina Lindorfer, Yanick Fratantonio, Victor Van Der Veen, Christian Platzer Andrubis: Android Malware Under The Magnifying Glass Vienna University of Technology, Tech. Rep. TRISECLAB-0414-001(2014).

\* cited by examiner

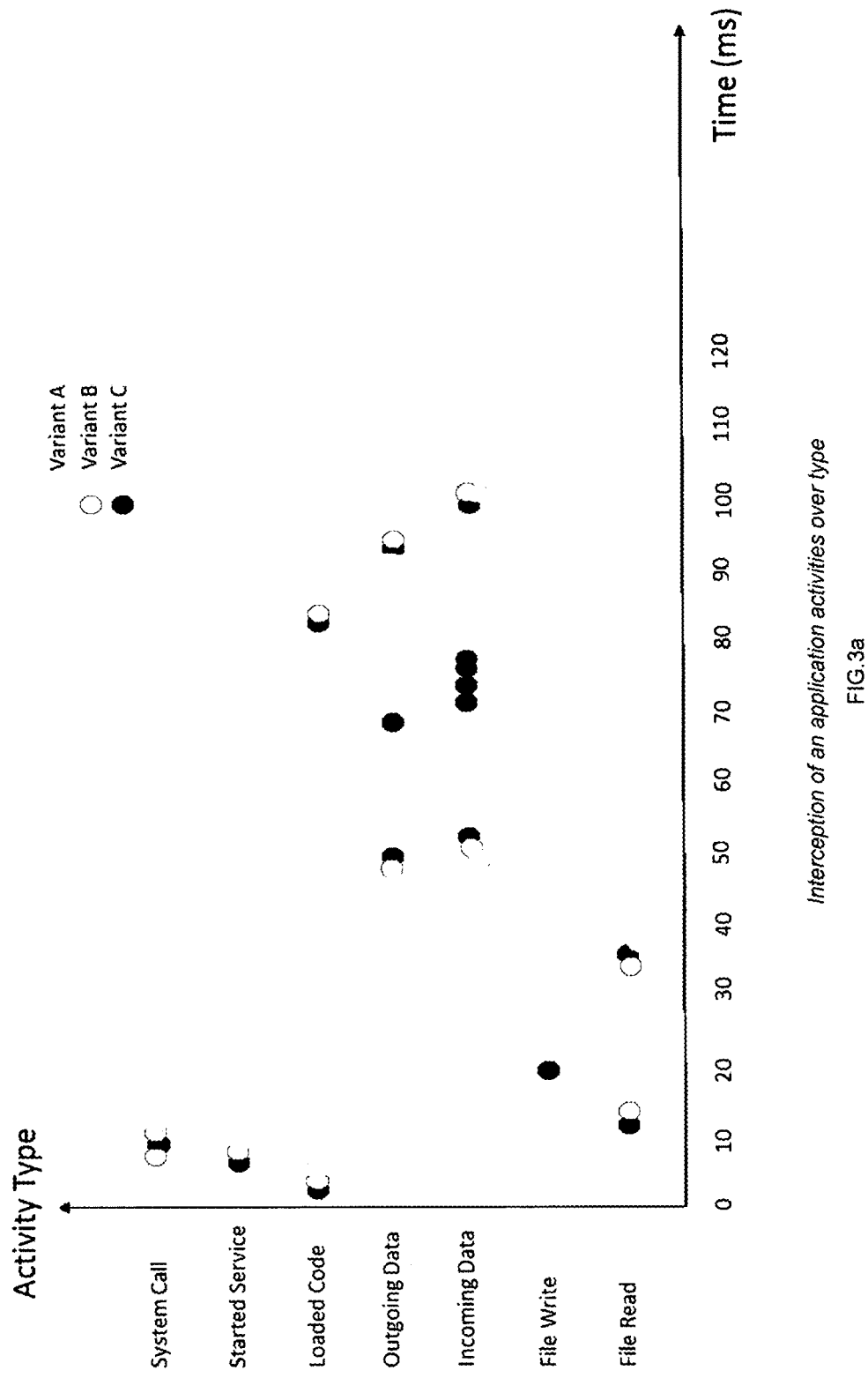

Sample behaviour pattern of a malware family

| Activity Type | Probability of occurrence | Time (ms) | Time Variance (ms) |
|---|---|---|---|
| Loaded Code | 0.9445 | 5 | 8 |
| Start Service | 0.9283 | 10 | 12 |
| System Call | 0.9911 | 11 | 13 |
| File Read | 0.6542 | 14 | 5 |
| File Read | 0.8881 | 35 | 5 |
| Outgoing Data | 0.9910 | 47 | 23 |
| Incoming Data | 0.9901 | 52 | 18 |
| Incoming Data | 0.5183 | 75 | 19 |
| Loaded Code | 0.6964 | 85 | 4 |
| Outgoing Data | 0.9922 | 93 | 25 |
| Incoming Data | 0.9729 | 101 | 28 |

*Signature created out of dynamic attributes*

FIG.4a

Creation of dynamic signature for a legitimate application downloaded from application stores

*Detection of repackaged application at runtime*

METHOD TO DETECT ZERO-DAY MALWARE APPLICATIONS USING DYNAMIC BEHAVIORS

CROSS-REFERENCE TO RELATED APPLICATION

This application claims the benefit of provisional Application No. 62/194,879 filed on Jul. 21, 2015 which is incorporated herein in its entirety.

BACKGROUND

Malware applications are increasing in number for both desktop and mobile platforms. Besides increasing in number, malwares are evolving and malicious developers discover new ways of bypassing regular antivirus/antimalware applications which provide protection by static analysis of malware applications. Detection of zero-day malware is an important problem for desktop as well as mobile security products.

In order to detect malicious applications most security products employ a signature-based approach. The signatures are usually created along with a static analysis of the application file, thus contain only static properties of the file. The basic and simplest form of a static signature is the hash value of the application file, which is created using CRC and/or MD5 hashing methods.

More generic signatures are also created by applying reverse engineering techniques such as decompiling and disassembling the executable, extracting of source code etc. While analyzing generated by reverse engineering techniques outputs, a malware analyst tries to identify the most distinguishable parts of the code that exhibits malware behaviour, and creates a signature based on string matching and/or regular expression matching techniques. Different signatures created in this way are collected and listed one by one in a file which is called "signature database". This database file is sent to client applications. Further for each file analyzed, antivirus application either performs a check directly on the file or extracts the file being processed and decompiles the output where possible. Then antivirus opens the signature database and processes each signature one by one, checks the signature against the decompiled output and performs a comparison of signature (simple CRC/MD5 signature or generic/complex signature based on regular expression matching). If the signature matches the decompiled output, detection occurs.

In order to perform detections for newly created malware applications, it is important to keep signature database up-to-date on the client side.

These methods create a pattern of string based on the extracted, decompiled output of a malware application that has already been identified as malicious. Thus, the detection of a malware initially depends on a previous encounter of the application, in which it already performed its malicious behaviour without being detected. For this reason the main problem of current signature-based antivirus protections is that they first allow malicious behaviour to happen, then develop a signature for that behaviour and try to detect further occurrences in other computers/mobile devices.

On the other side, the signatures created out of static properties of a malware application are weak and insufficient to detect even small changes on the target file. Hash based signatures such as CRC and/or MD5 are created solely for a single file, and are able to detect only that file. It is not possible to match a range of malicious application that exhibit similar behaviour, which is called a malware family, because the hash-based signature is only a hash output of one application and thus cannot be matched for other similar files in the same malware family. Moreover, if the same application is compiled twice and only one bit of information is different after two compilations, their hashes will be different too, thus a signature created for the first application will not detect the second one.

Generic signatures aim to overcome this problem and try to identify different parts of decompiled/disassembled code of the malware application. They contain parts of the code which are distinctive enough and those parts are formed in a regular expression so that they are able to match all files that contain the same code parts. This way not only a single malicious application is detected but a whole collection of malwares that exhibit similar behaviours could be detected.

However generic signatures method has certain disadvantages. For example, there is inability to track the application at runtime, thus only one check is performed at a specific time (usually at the installation phase) and if the malware application passes that check, then it may show malicious behaviour at runtime. But in order to hide from antivirus applications malicious parties generally utilize advanced techniques such as encrypting sensitive data, changing method/class names, etc. In such cases antivirus application cannot detect the malicious application.

On the other hand, the generic signature may create false-positive detections. In order to find possibly all malwares of a family, the generic signature should be defined in a broad sense, containing any feature likely to be included in different malwares of family. Unfortunately, creating a signature that is defined to include wide properties of a malware family may end up with detection of clean applications as well, which creates false-positive detection. Thereby the antivirus application makes a wrong decision which does not only mislead the user, but also blame and obstruct the clean application to be installed (or warned about it), a result that is highly unwanted for antivirus products.

The third problem with generic signatures is their incomplete ability to catch different variants of the same malware family. Since the broad definition of a malware generates many false-positive results, the malware analysts are obliged to create precise definition for signatures which results with an output signature that may be unable to detect new variants of the same malware.

Other dynamic behaviour-based malware detection systems employ only detection on virtual environment and do not provide a "signature based on runtime dynamic behaviours" that is also used on mobile device in detection and prevention of the malware.

Thus, there is need in new method that would provide more effective detection and prevention of malware applications thus creating a trusted online experience.

SUMMARY OF INVENTION

The current invention is a method and system to identify and detect zero-day malware applications based on their behavioural analysis.

Invention works by monitoring and extracting some predefined features of the application such as file read/write, service start, loaded classes, incoming/outgoing network data which are gathered from the application at runtime.

The method incorporates two steps for performing the identification. In the first step, the dynamic behaviour is monitored and a pattern is extracted. In the second step, the activities of the actual application running on computer desktop or mobile device are intercepted and compared with the pattern previously extracted.

The new signature type will be created for each different malware family, thus any malware of the same family could easily be detected based on its behaviours even if the application hides itself from regular static signatures created for that malware family. This type of signatures may also be utilized for detection of re-packaged legitimate applications converted to malicious programs.

The detection performed using dynamic behaviours of malware applications has many advantages over current state-of-the-art technology. With this method it is possible, for example, that a zero-day malware which is generated as a variant of a malware family could be detected by only comparing its behaviours to the family's behaviours. Or it is possible to detect re-packaged malware applications by performing anomaly detection.

BRIEF DESCRIPTION OF DRAWINGS

FIGS. 3a and 3b are diagrams of another embodiment of the invention where behaviour types are presented in the form of activity map.

FIG. 4a is a depiction of another embodiment of the invention where profile is created offline in order to hook application runtime behaviours.

DETAILED DESCRIPTION

The present invention discloses the method and system to identify and detect zero-day malware applications based on their behavioural analysis. This way a new type of signature will be created out of dynamic behaviours of the applications.

Figure 1:
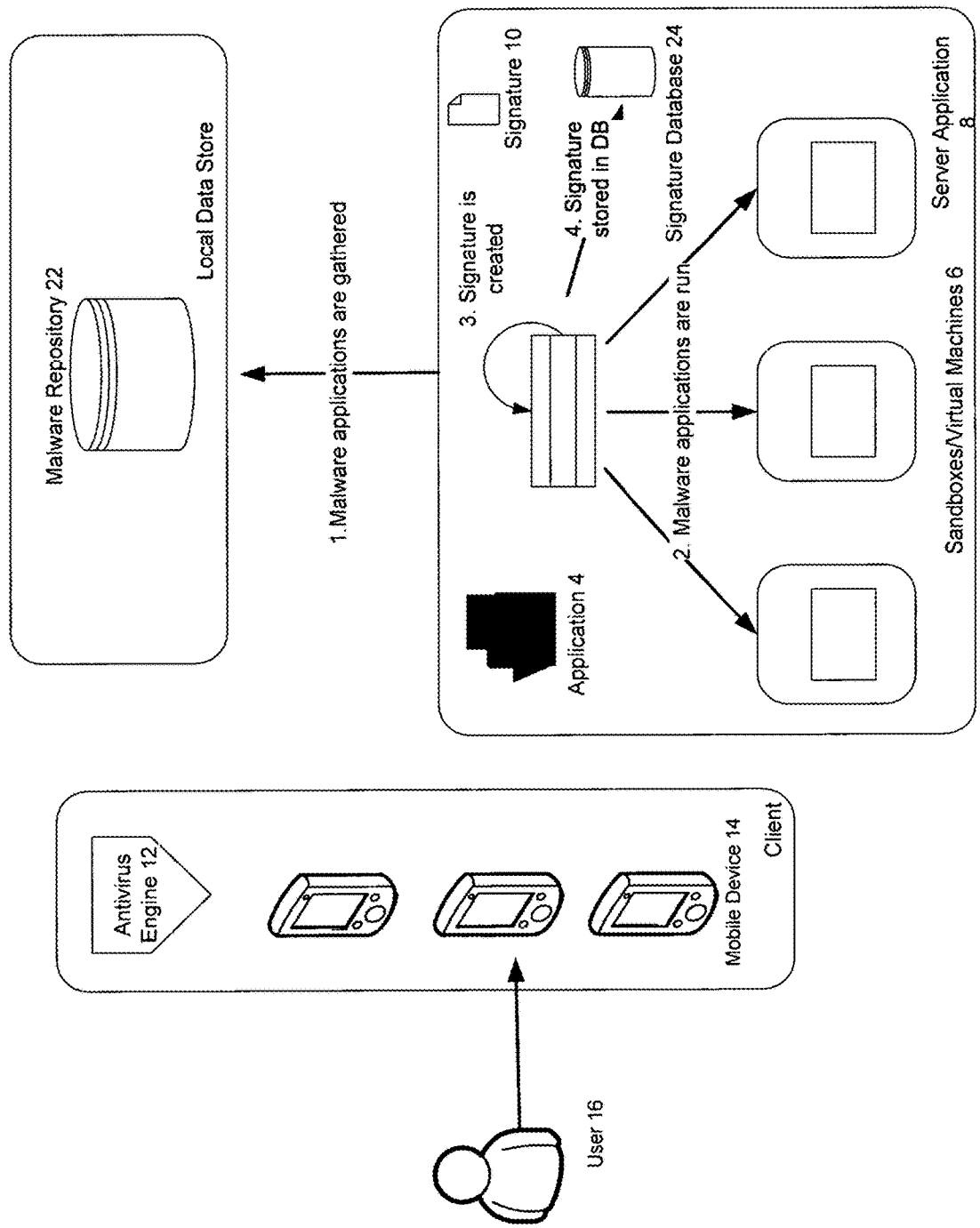
FIG. 1 is a depiction of general scheme of the invention.

The FIG. 1 shows the general scheme of the invention. Firstly there should be identified the different behaviour types 2, that may be listed as: file read and write operations, started services, loaded classes, incoming/outgoing network data, sent SMS and phone calls, listing broadcast receivers, cryptography operations performed using system calls, although this list is not exclusive and other dynamic behaviours as would be known to one skilled in the art may also be identified. After identifying the different activity types 2, the method employs a two phase process. In the first phase there is created an infrastructure to intercept and catch the dynamic activities of a running application 4 in offline mode. This infrastructure may easily be setup using a virtual machine/sandboxes 6, on a server 8 and hooking the predefined system calls and/or activities. The second phase of the process is to distribute the dynamic behaviour signature 10 to antivirus engines 12 running on mobile device 14 of user 16.

Figure 2:
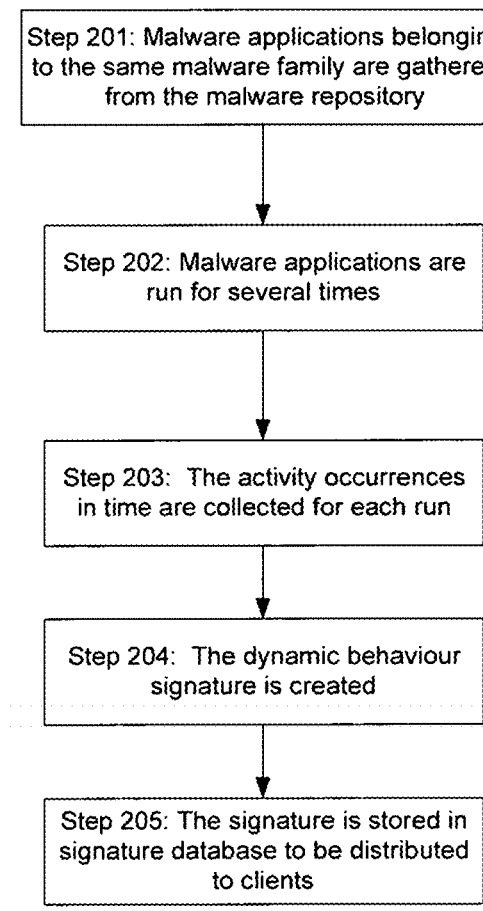
FIG. 2 is a flowchart of one embodiment of the invention where the process of dynamic signature creation on server side is shown.

In FIG. 2 the process of dynamic signature creation on server side is shown. In step 201 the malware applications belonging to the same malware family are gathered from the malware repository 22. In step 202 malware applications are run for several times. In step 203 the activity occurrences in time are collected for each run. In step 204 the dynamic behaviour signature 10 is created. Then the signature 10 is stored in signature database (sig_db) 24 to be distributed to clients, step 205.

Figure 3B:
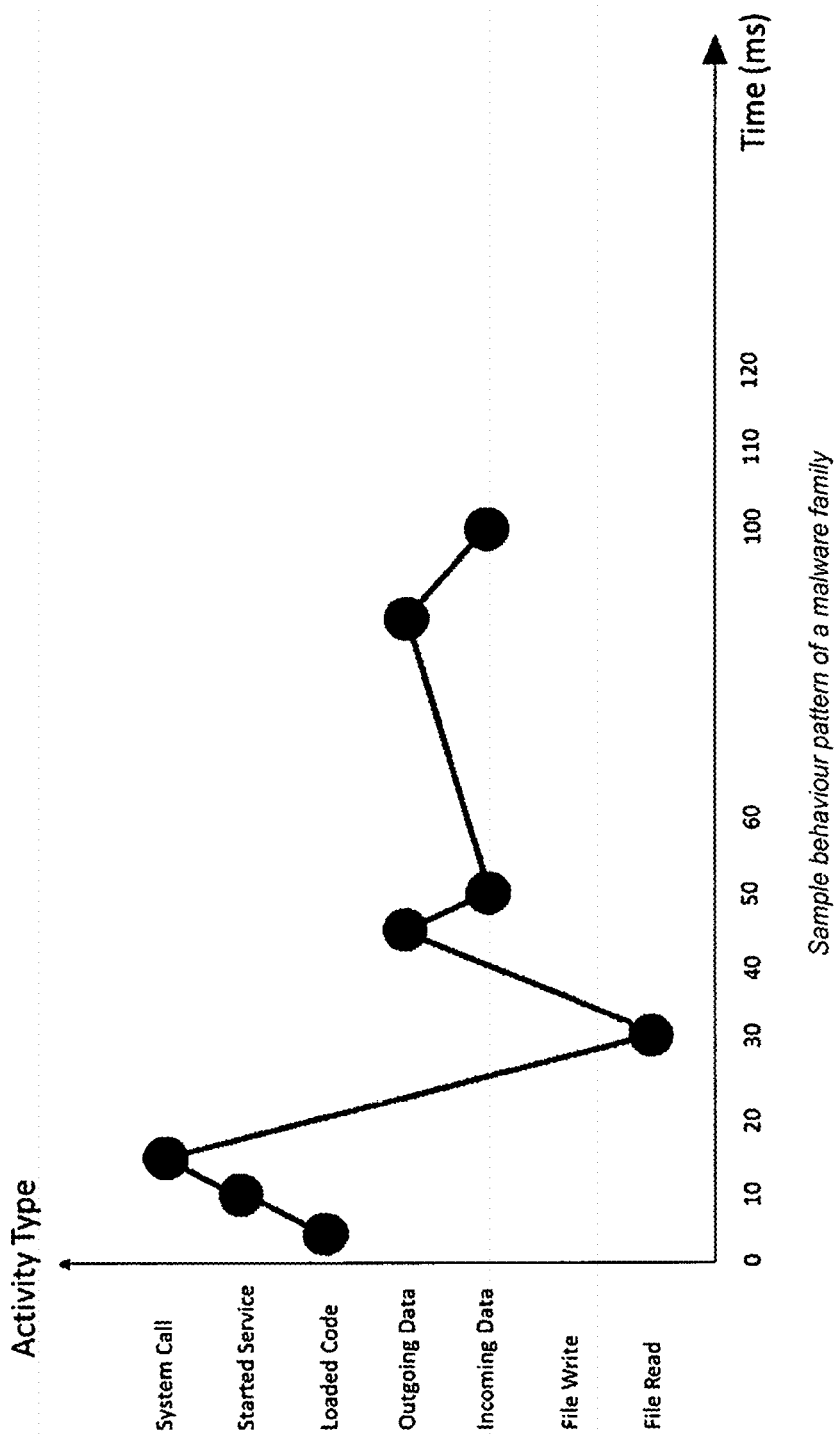
Figure 3C:
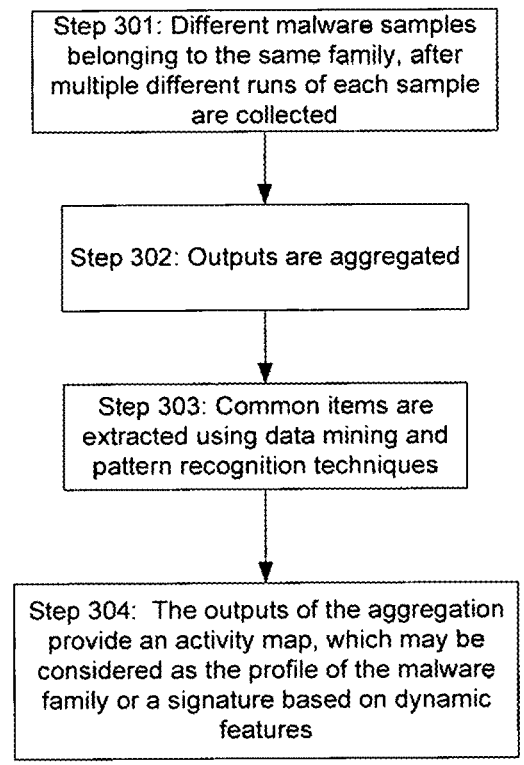
FIG. 3c is a flowchart of another embodiment of the invention where behaviour types are presented in the form of activity map.

FIGS. 3a, 3b, 3c are diagrams and flowchart where behaviour types 2, or activity occurrences that are monitored during the execution of different malware applications 18 of the same malware family 20, are presented in the form of activity map. In step 301 different malware samples belonging to the same family 20, after multiple different runs of each sample are collected. In step 302 outputs are aggregated and in step 303 common items are extracted using data mining and pattern recognition techniques. Finally the outputs of the aggregation provide an activity map, which may be considered as the profile 26 of the malware family 20 or a signature 10 based on dynamic features in terms of antivirus technology, step 304.

Figure 4B:
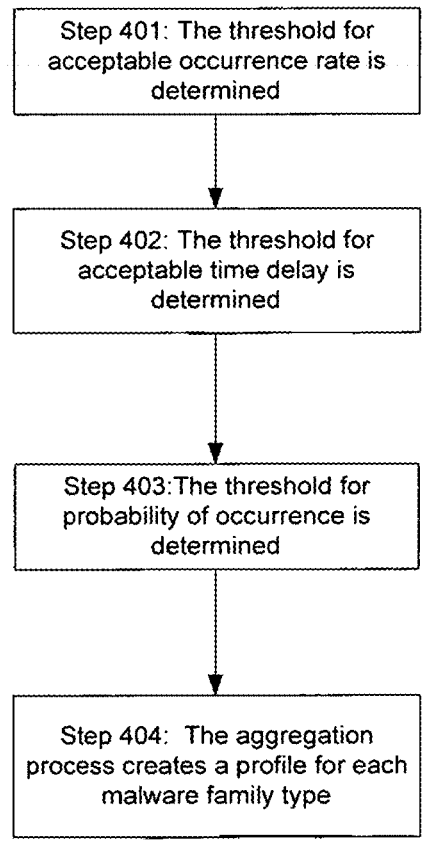
FIG. 4b is a flowchart of another embodiment of the invention where profile is created offline in order to hook application runtime behaviours.

FIGS. 4a and 4b demonstrate depiction and flowchart where profile 26 is created offline, in laboratory, using virtual devices and/or real devices, running modified operating systems, in order to hook application 4 runtime behaviours. The output should be aggregated by the following algorithm. In step 401 threshold for acceptable occurrence rate is determined. The threshold for the occurrence count in aggregation to be accepted to add an activity to the profile is selected as half of total number of runs that is 50%. In step 402 the threshold for acceptable time delay is determined. The threshold of time delays in aggregation to be accepted to add an activity to the profile is selected as standard deviation compared with the mean. The computation would be:

For each new activity of a new sample, there is calculated the mean time $\mu$ for activity type x, having probability p equally distributed for each sample:

$$\mu_x = x_1 p_1 + x_2 p_2 + \ldots + x_k p_k$$
$$= \sum x_i p_i$$

Then there is calculated the variance ($\sigma2$) of the samples by taking the probability of occurrence as equal:

$$\sigma_y^2 = \Sigma(x_i - \mu_x)^2 p_i$$

There is calculated the standard deviation a as the root of variance.

The minimum and maximum thresholds as $\mu-\sigma$ and $\mu+\sigma$ are set.

In step 403 threshold for probability of occurrence is determined. It is the ratio of samples occurred for this activity given that first two thresholds are satisfied. In step 404 the aggregation process creates a profile 26 for each malware family type. The profile 26 may be considered as the dynamic signature for the whole malware family 20.

Figure 5:
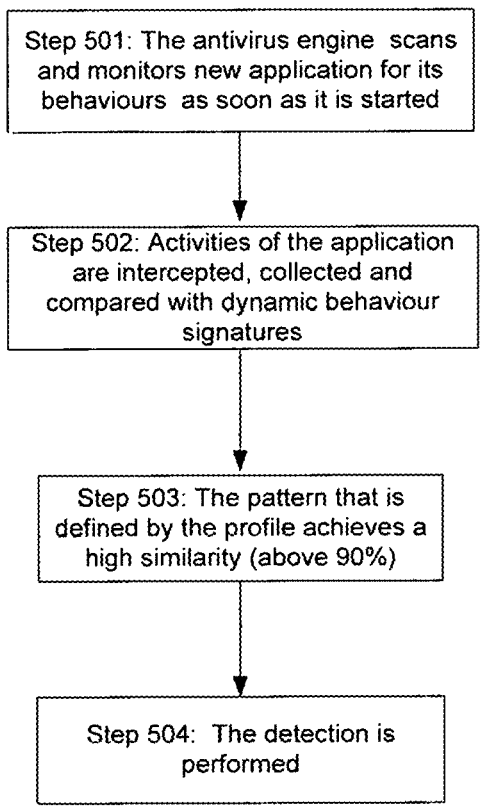
FIG. 5 is a flowchart of another embodiment of the invention where dynamic behaviour signature is distributed to antivirus engines running on user's mobile devices.

In FIG. 5 dynamic behaviour signature 10 is distributed to antivirus engines 12 running on user's mobile devices 14. In step 501 once the signature 10 is distributed, the antivirus engine 12 scans and monitors a new application 4 for its behaviours 2 as soon as it is started. In step 502 activities of the application 4 are intercepted, collected and compared with dynamic behaviour signatures 10. The comparison between the signature and the actual behaviour is performed based on activity type and time of occurrence. In step 503 the pattern that is defined by the profile 26 achieves a high similarity (i.e. above 90%). The similarity ratio is measured and calculated for each dynamic signature 10. Thus in step 504 the detection is performed.

Figure 6A:
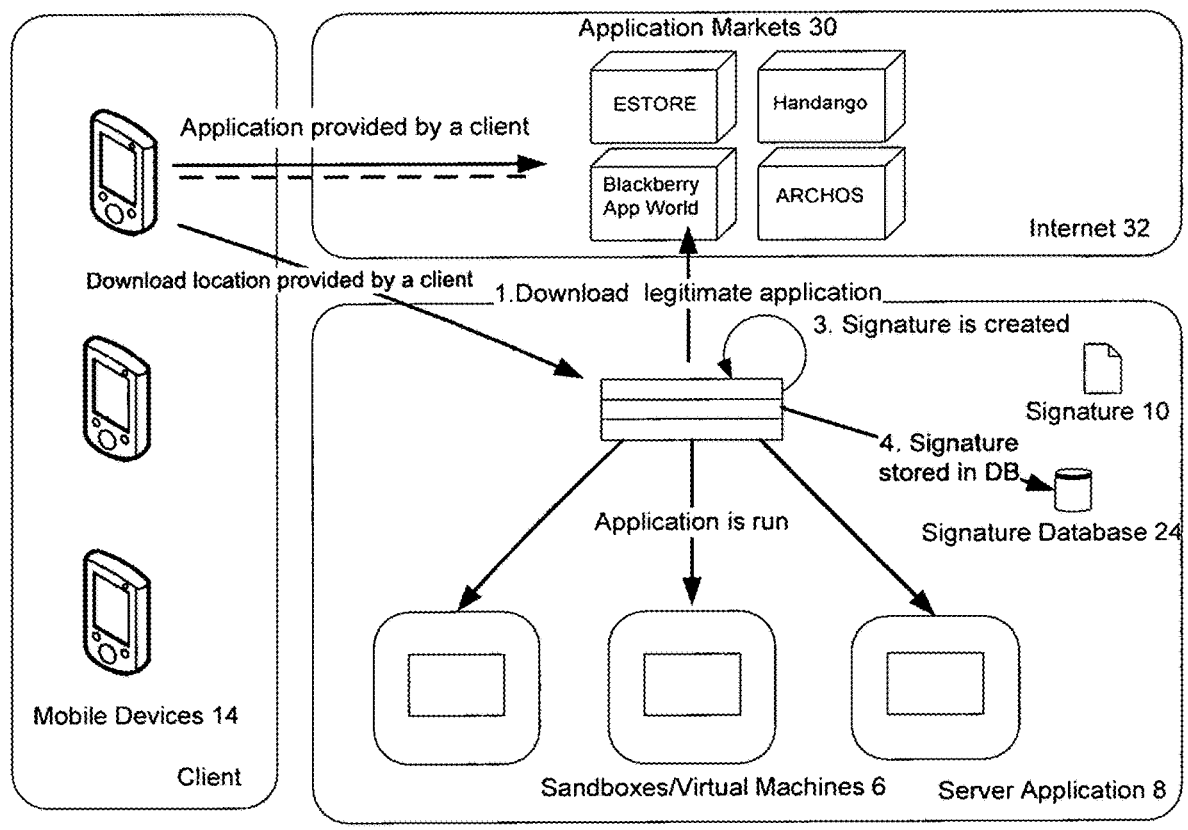
FIGS. 6a and 6b are depictions of another embodiment of the invention where invention method is used for creation of dynamic signature for a legitimate application downloaded from application stores and detection of malicious re-packaged applications.
Figure 6B:
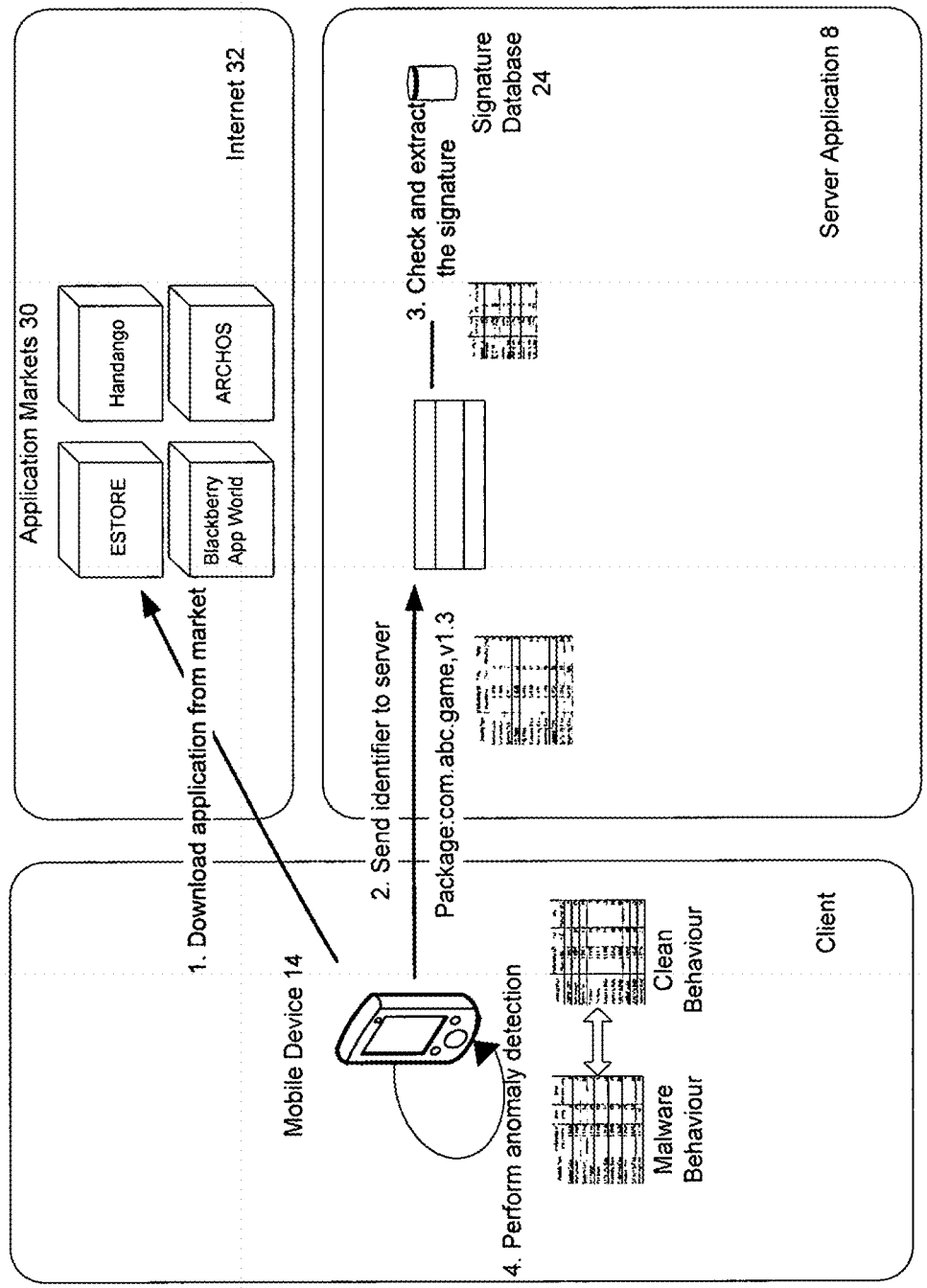
Figure 6C:
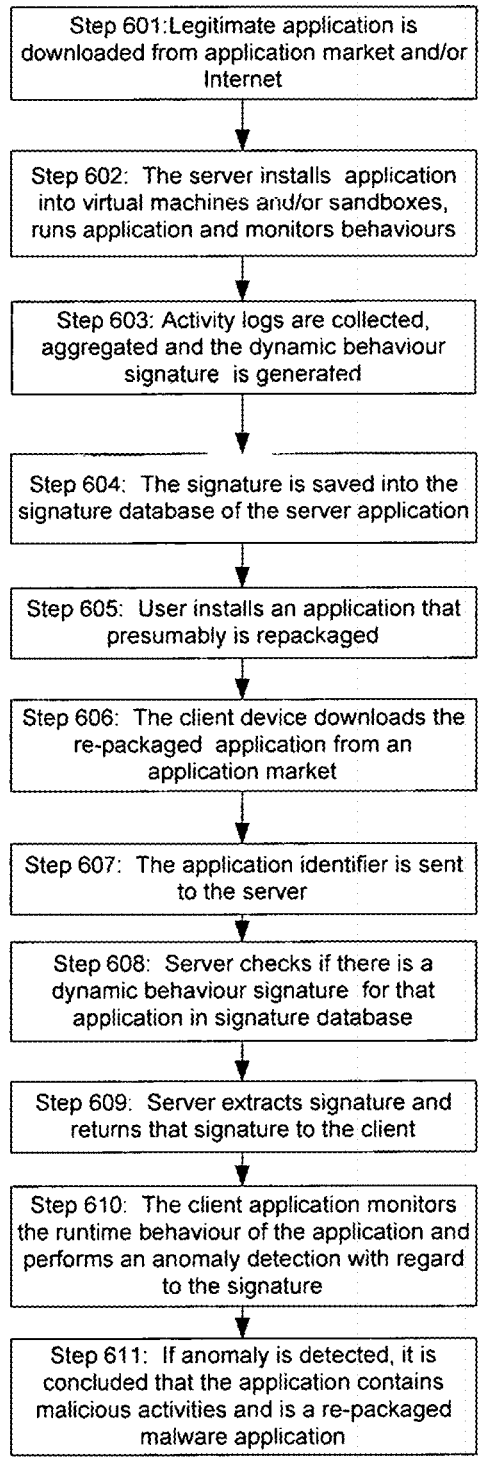
FIG. 6c is a flowchart of another embodiment of the invention where invention method is used for creation of dynamic signature for a legitimate application downloaded from application stores and detection of malicious re-packaged applications.

FIGS. 6a, 6b and 6c demonstrate depictions and flowchart where invention method is used for creation of dynamic signature 10 for a legitimate application downloaded from application stores and detection of malicious re-packaged applications 28. Contrary to the malware behaviour signature extracted for a malware family 20, here firstly the clean behaviour signature is extracted for an application known to be legitimate. Then signature is compared with the runtime behaviour of the same application and detection if there is an anomaly comparing to the clean profile application is performed. In step 601 a legitimate application is downloaded from application market 30 and/or Internet 32. It is possible that the application to be downloaded and/or download location may be provided by a client application that has already downloaded the file before. In step 602 the server 8 installs the application into several virtual machines and/or sandboxes 6, runs the application for a predefined period of time and monitors the behaviours while collecting the activity types 2 and their respective timestamps. Once the application executions are finalized, all the activity logs are collected, aggregated and the dynamic behaviour signature 10 is generated, step 603. In step 604 the signature 10 is saved into the signature database 24 of the server application. In step 605 after the creation of signature 10, a user 16 installs an application that presumably is repackaged and has the same application identifier (package name, version etc. ...) as the original application. The user 16 is tricked to believe that this application is legitimate. However, the application contains malicious code, even though the application identifier seems to be legitimate. In step 606 in order to perform the detection, the client device downloads the re-packaged (malware) application 28 from an application market 30. Then, in step 607, it sends the application identifier (package name, version and/or other info required) to the server 8. The server 8 checks if there is a dynamic behaviour signature 10 for that application in signature database 24 by sending only package information, step 608. In step 609 server 8 extracts signature 10 and returns that signature to the client. In step 610 the client application monitors the runtime behaviour of the application, extracts its activities type and times, and performs an anomaly detection with regard to the signature 10, which is gathered from the server 8. If an anomaly is detected, step 611, it is concluded that new application contains malicious activities and is a re-packaged malware application 28.

Figure 7:
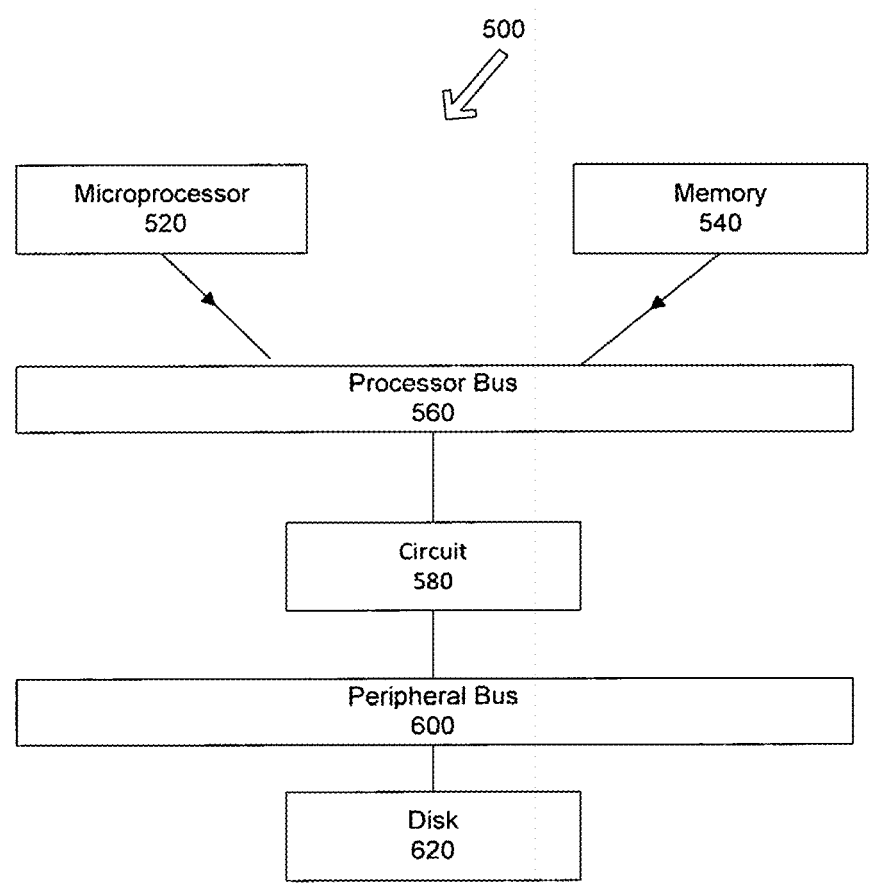
FIG. 7 is a schematic of the memory and hardware of a computer or handheld device such as a tablet or smartphone.
Figure 8:
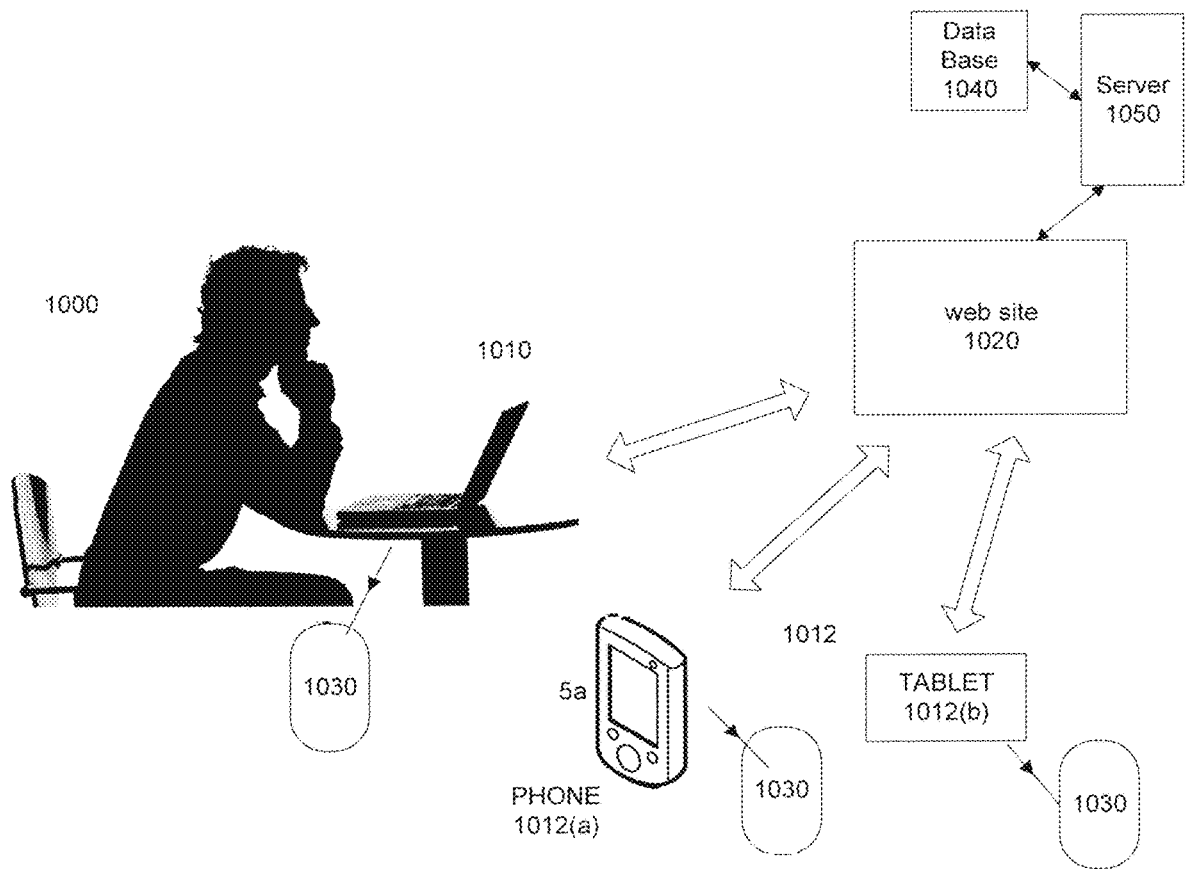
FIG. 8 is a schematic of an individual user operating a computer or handheld device connected to the internet.

The system and method of the present invention may be used with computer systems and devices as shown in FIGS. 7 and 8. FIG. 7 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

As shown generally by FIG. 8, there is a user 1000 of a computer 1010 or handheld device 1012 who accesses an Internet website 1020 with network connections to a server 1050 and database 1040. The computer 1010 or handheld device is compatible with operating systems known in the art, such as Windows, iOS or android devices or android type operating systems. The user 1000 is potentially exposed to many malicious or unsafe applications located on the web or a particular website 1020 due to lack of security and validation with the source, even though the website 1020 itself may be known as reliable and trusted. The website may be an application store or directory which includes other software applications for downloading. Similarly, receiving email may introduce unsafe internet links, applications and attachments to the user's computer or device. Those of skill in the art would recognize that the computer 1010 or hand held devices 1012a or 1012b each has a processor and a memory coupled with the processor where the memory is configured to provide the processor with executable instructions. A boot disk 1030 is present for initiating an operating system as well for each of the computer 1010 or hand held devices 1012. It should also be noted that as used herein, the term handheld device includes phones, smart phones, tablets, personal digital assistants, media and game players and the like. It should also be understood that the user's computer or device may be part of an internal network or system which is communicating with the Internet. As used throughout the specifications, the term "query" or "queries" is used in the broadest manner to include requests, polls, calls, summons, queries, and like terms known to those of skill in the art.

Figure 9:
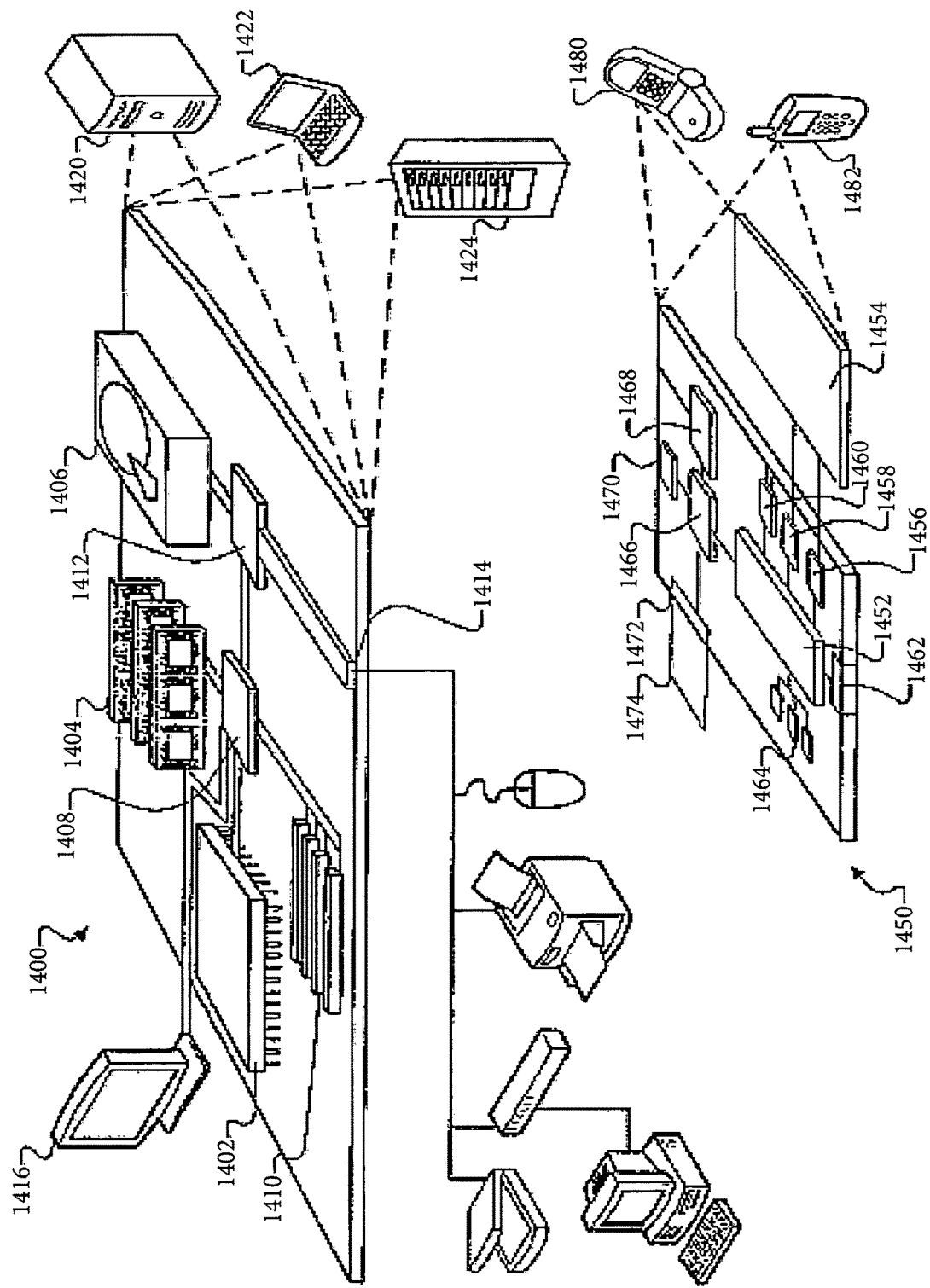
FIG. 9 illustrates computer devices.

FIG. 9 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the 10 implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a Microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method to identify and detect zero-day malware applications based on behavioural analysis comprising:
    identifying different behaviour types consisting of: file read and write operations, started services, loaded classes, sent SMS and phone calls, listing broadcast receivers, cryptography operations performed using system calls;
    creating an infrastructure to intercept and catch dynamic activities of a running application in offline mode through setting up a virtual machine or a sandbox on a server and hooking predefined system calls or activities; and
    distributing a dynamic behaviour signature, said signature based on dynamic features, to antivirus engines running on user's mobile devices;

scanning and monitoring by said antivirus engines said running application for behaviours of said application once said running application is started;
  said dynamic behavior signature is created on server side comprising:
  gathering malware applications belonging to a same malware family from a malware repository;
  running said malware applications for several times and collecting the activity occurrences in time for each run;
  creating said dynamic behaviour signature; and
  storing said dynamic behaviour signature in a database to be distributed to clients;
  intercepting activities of said application, collecting said activities and comparing with said dynamic behaviour signatures where a comparison between said dynamic signature and actual behaviour is performed based on behaviour type and time of occurrence;
  determining a similarity ratio for each said dynamic signature; and
  verdicting a detection of malware for said running application if the similarity ratio is above 90% of a profile where said profile is a dynamic signature of a malware family and said profile is created offline using virtual devices and/or real devices, running modified operating systems, in order to hook application runtime behaviours comprising:
  determining threshold for acceptable occurrence rate;
  determining threshold for acceptable time delay;
  determining threshold for probability of occurrence; and
  creating by aggregation process said profile for each malware family type.

2. The method according to claim 1, where said dynamic signature for a legitimate application downloaded from application stores is created and malicious re-packaged applications are detected comprising:
  downloading said legitimate application from application markets and/or Internet;
  installing said legitimate application by said server into several of said virtual machines and/or said sandboxes, running said application for a predefined period of time and monitoring the behaviours while collecting the activity types and their respective timestamps;
  collecting and aggregating activity logs and generating said dynamic behaviour signature;
  saving said dynamic behaviour signature into a signature database of a server application;
  installing by user an application that presumably is re-packaged and has the same application identifier as the original application;
  downloading by said client device said re-packaged application from said application market;
  sending said application identifier to said server;
  checking by said server if there is said dynamic behaviour signature for the application in said signature database by sending only package information;
  extracting by server said dynamic behaviour signature and returning said dynamic behaviour signature to said client;
  monitoring by said client application the runtime behaviour of said application,
  extracting activities type and times from said application and performing an anomaly detection with regard to said dynamic behaviour signature, which is gathered from said server;
  concluding that said application contains malicious activities and is said re-packaged malware application if an anomaly is detected.

3. The method according to claim 1, where said acceptable occurrence rate is selected as half of total number of runs.

4. The method according to claim 1 wherein said different behaviour types further consists of incoming/outgoing network data.

5. A method to identify and detect zero-day malware applications based on behavioral analysis comprising:
  identifying a set of dynamic behavior types of an unknown application, where said set of behavior types is selected from a group consisting of:
    file read and write operations, started services, loaded classes, sent SMS and phone calls, listing broadcast receivers, cryptography operations performed using system calls;
  creating an infrastructure to intercept and catch said dynamic activities of running said unknown application in offline mode wherein said infrastructure includes of a computing device comprising a non-transitory computer readable medium storing program instruction that, when executed by a processing unit, cause the processing unit to identify said dynamic behavior signature of said unknown application by running said unknown application on said computing device;
  monitoring and recording said set of dynamic behaviour types in said non-transitory computer-readable medium of said computing device;
  aggregating said set of dynamic behaviour types by a predetermined algorithm wherein said predetermined algorithm comprises:
  determining a threshold for acceptable occurrences rate of said dynamic behavior types and a threshold for the occurrence count of said dynamic behavior types and a threshold for acceptable time delay between each of said set of dynamic behavior types;
  calculating a mean and as standard deviation of each of said thresholds;
  determining a threshold for probability of occurrence;
  creating said profile of said unknown application based on said threshold for probability of occurrence;
  distributing said dynamic behavior signature to said antivirus engines running on mobile device of user
  where said dynamic behavior signature is created on server side comprising:
gathering malware applications belonging to a same malware family from a malware repository;
running said malware applications for several times and collecting the activity occurrences in time for each run;
creating said dynamic behaviour signature; and
storing said dynamic behaviour signature in a database to be distributed to clients.

6. The method to identify and detect zero-day malware applications based on behavioral analysis according to claim 5 wherein said behavior types monitored during execution of said malware applications of the same malware family are presented as an activity map comprising:
  collecting various samples of said malware applications belonging to the same malware family after multiple different runs of each of said sample;
  aggregating outputs of sample collecting and extracting common items using data mining and pattern recognition techniques;
  providing said activity map by said outputs aggregation which is considered as said profile of the malware family or said dynamic behaviour signature.

7. The method according to claim 5, where said acceptable occurrences rate is selected as half of total number of runs.

8. The method according to claim 5 wherein said set of behavior types is selected from a group consisting of: file read and write operations, started services, loaded classes, sent SMS and phone calls, listing broadcast receivers, cryptography operations performed using system calls, and incoming/outgoing network data.

* * * * *